United States Patent [19]

Shu

[11] Patent Number: 5,486,953
[45] Date of Patent: Jan. 23, 1996

[54] HYPERHEMISPHERICAL FIELD OF VIEW OPTICAL SENSOR HEAD

[75] Inventor: Ker-Li Shu, New Milford, Conn.

[73] Assignee: Hughes Aircraft Company, Los Angeles, Calif.

[21] Appl. No.: 170,137

[22] Filed: Dec. 20, 1993

[51] Int. Cl.[6] .................. G02B 13/06; G02B 5/14; G01J 1/20
[52] U.S. Cl. .................. 359/725; 359/583; 359/350; 359/726; 369/44.14
[58] Field of Search .................. 359/350, 355, 359/356, 357, 358, 359, 629, 630, 631, 641, 725, 726, 728, 732, 736, 580, 583, 584, 794, 717; 369/44.14, 44.23; 356/434

[56] References Cited

U.S. PATENT DOCUMENTS 4,889,409  12/1989  Atcheson .................. 359/732
5,007,689   4/1991  Kelley et al. .................. 359/350

Primary Examiner—P. M. Zierzynski
Assistant Examiner—Andrey Chang
Attorney, Agent, or Firm—W. C. Schubert; W. K. Denson-Low

[57] ABSTRACT

An optical sensor head (400) for providing an optical sensor with a hyperhemispherical field of view is disclosed. The optical sensor head (400) includes first and second lenses (430 and 440), each of the lenses (430 and 440) having a planar surface (434 and 444) and a convex surface (432 and 434). The sensor head (400) further includes a film (420) positioned between the lenses (430 and 440) for splitting the light beams impinging thereon.

12 Claims, 3 Drawing Sheets

FIG. 5
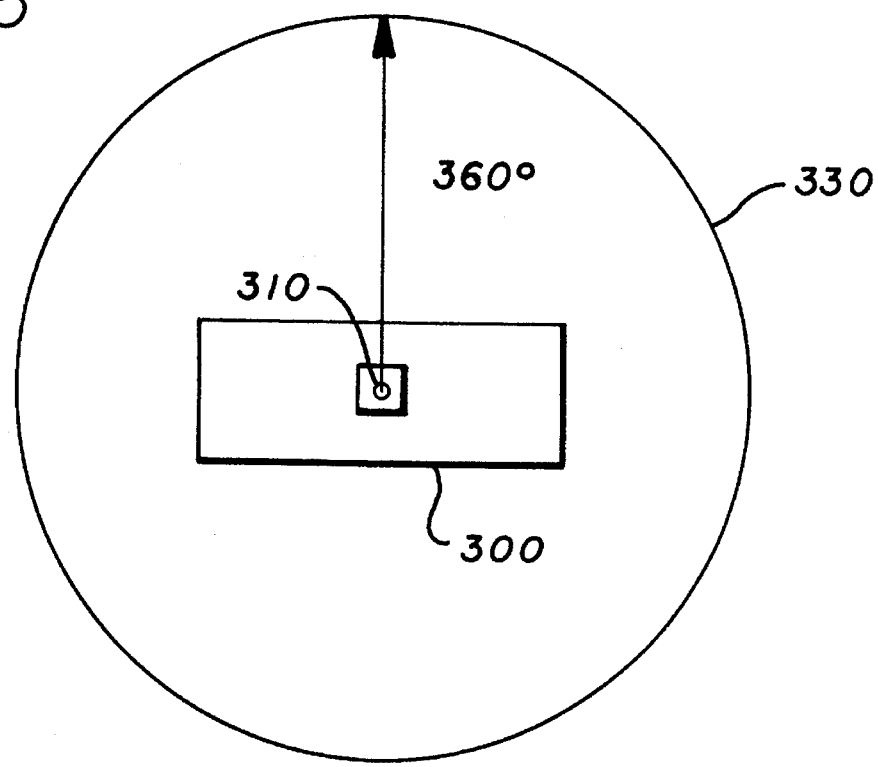
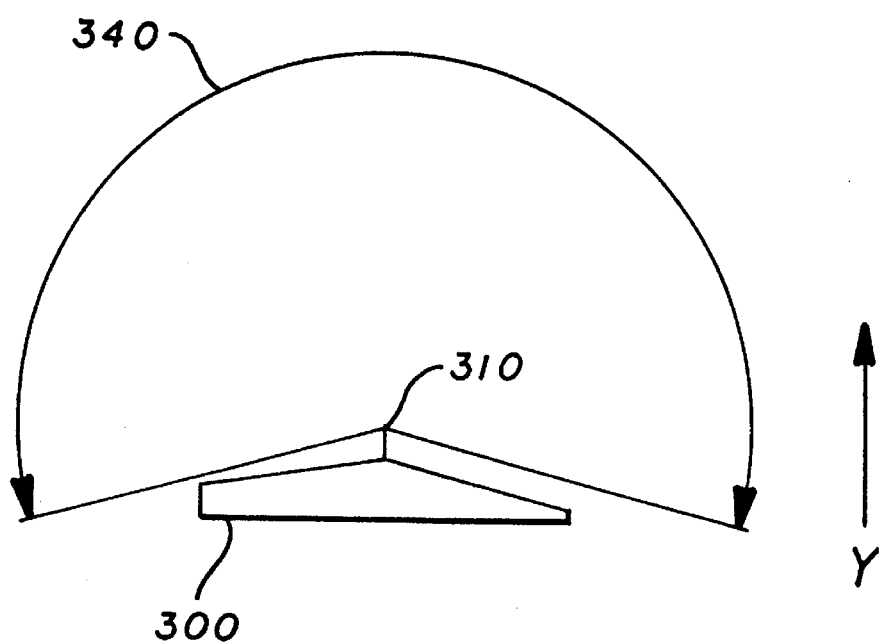
FIG. 6

HYPERHEMISPHERICAL FIELD OF VIEW OPTICAL SENSOR HEAD

FIELD OF THE INVENTION

The present invention is directed to an apparatus for detecting light signals over a large field of view. More specifically, the present invention is directed to a single detector sensor head which allows for detection of coherent light signals over a wide field of view.

BACKGROUND OF THE INVENTION

In many applications where the detection of light signals, particularly coherent light signals or laser signals, is desirable, it is also important to be able to detect such signals arriving at the detector from all directions. Since sensors inherently have limited fields of view, sensor heads are employed which may focus signals originating outside a sensor's nominal field of view onto the sensor for detection.

The use of an optical sensor head to focus peripheral signals onto the sensor has several advantages over other choices such as increasing the number of sensors. First, a properly designed sensor head will likely be much less expensive than the cost of adding sensors and the associated electronics. Second, in applications where the electronic complexity of additional sensors is undesirable, fewer sensors with larger fields of view offer a favorable design option.

Although the choice of increasing the sensor's field of view offers economic and practical advantages over the choice of increasing the number of sensors, designing the proper sensor head is not without difficulties, particularly where the detection of coherent signals is concerned. Optical sensor head designs which employ a multiplicity of individual sensor heads cause their own problems, particularly where the sensor must detect laser signals.

Among the problems associated with a multiple head design are the complicated optics required to keep internal scattering at a minimum and still provide a large field of view for the detector. If the sensor is to detect laser signals internal reflections may result in a loss of coherence of the incident signal. Further, as a result of the complicated optics, losses of signal strength may be unacceptably high. Finally, even with a multiple-head design the field of view may be inadequate for a particular application.

What is need, then, is a design for the optical sensor head which optimizes the field of view without suffering from the above-mentioned defects. Such a solution must offer a favorable economic trade-off to the addition of more sensors and more electronics while allowing for a field of view which is adequate for a particular application.

SUMMARY OF THE INVENTION

The present invention is directed toward an apparatus for providing an optical sensor with a hyperhemispherical field of view. Thus, in a system having an optical sensor and an optical sensor head, with the optical sensor head for providing a wide field of view for the sensor; the optical sensor head comprises first and second plano-convex lenses. Each of the lenses has a planar surface an a convex surface. The optical sensor head of the present invention further comprises means positioned between the lenses for splitting the light beams impinging thereon. The two convex surfaces are anti-refraction coated to minimize the refraction loss of two surfaces.

The present invention has several advantages over designs using multiple sensor heads. First, use of the plano-convex lenses in combination with the beam splitter allows for a hyperhemispherical field of view. The field of view thus created has no blind spots. Second, the design of the optical sensor head in accordance with the present invention is, optically speaking, very simple. Thus, the complexity of the multiple head designs is avoided. Third, since there are no scattering surfaces inherent in the design, the coherence of incoming light signals is maintained. As a consequence, the sensor head of the present invention is ideal for use in the detection of laser signals. Finally, the loss of signal strength is reduced when compared with other designs.

BRIEF DESCRIPTION OF THE DRAWINGS

FIG. 5 shows the field of view provided by a sensor head in accordance with the present invention in the horizontal plane.

FIG. 6 shows the field of view of the optical sensor head of FIG. 5 in the vertical plane.

DETAILED DESCRIPTION

The present invention is directed toward an improvement in the design of optical sensor heads. The following description is presented to enable one of ordinary skill in the art to make and use the invention as provided in the context of a particular application and its requirements.

Various modifications to the preferred embodiment will be readily apparent to those skilled in the art, and the generic principles defined here may be applied to other embodiments. Thus, the present invention is not intended to be limited to the embodiment shown, but is to be accorded the widest scope consistent with the principles and novel features disclosed herein.

Figure 1:
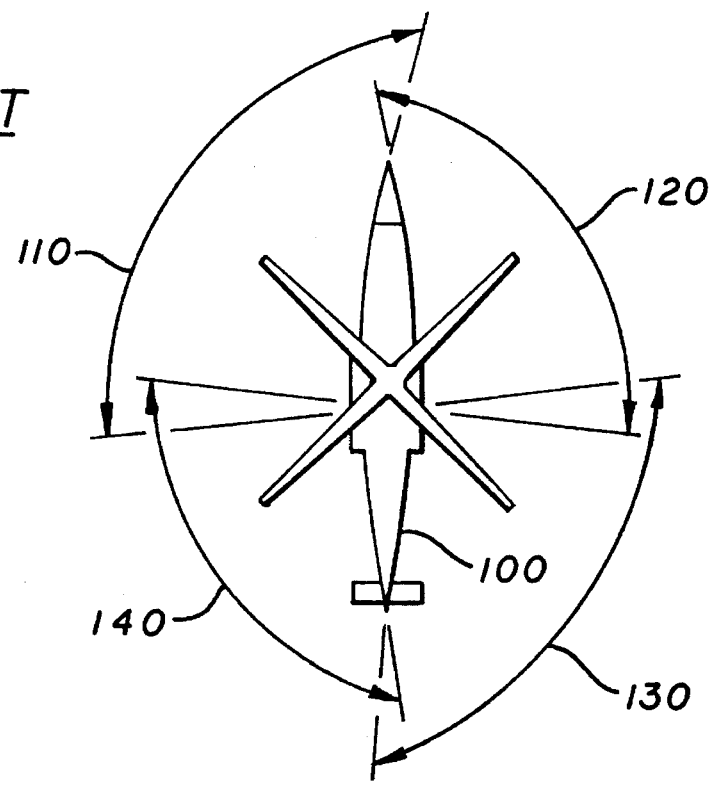
FIG. 1 shows the field of view provided by a first embodiment of a multiple sensor head arrangement in accordance with the prior art in the horizontal plane.

Referring now to FIG. 1, what is shown is a vehicle 100 with a multiple sensor system in accordance with the prior art. In this case, four separate sensor (not shown) are employed to provide four fields of view 110, 120, 130, 140. Each of the individual fields of view 110, 120, 130, 140 is approximately 100 degrees in its angular extent. In this embodiment, the individual fields of view 110, 120, 130, 140 overlap by 10 degrees.

Figure 2:
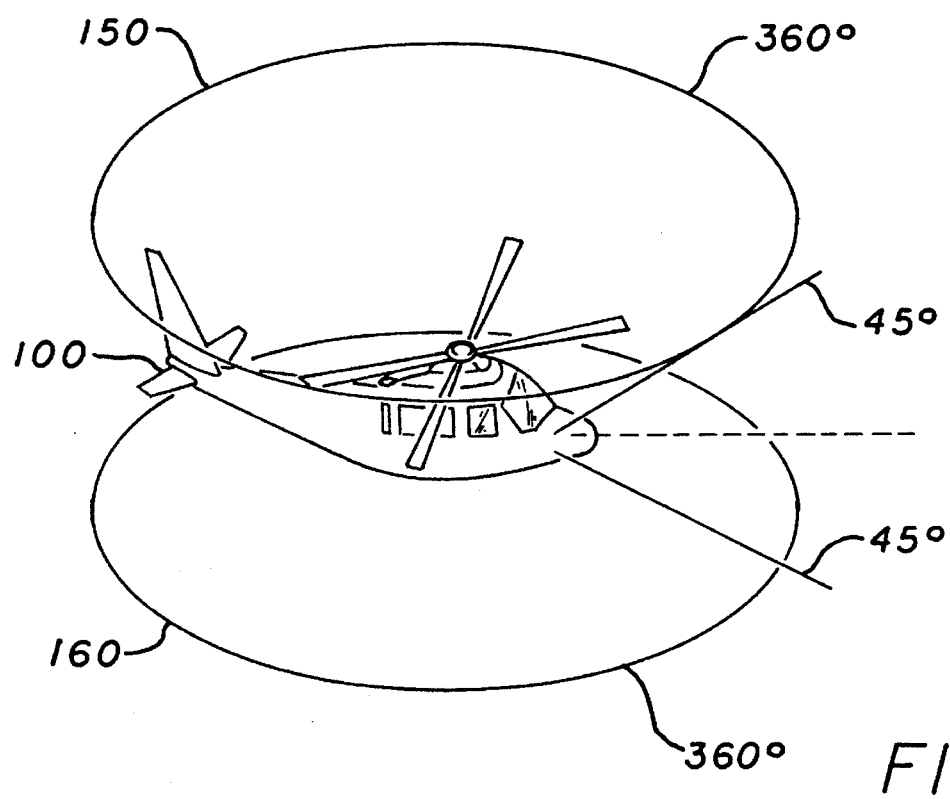
FIG. 2 shows the field of view of the sensor head of FIG. 1 in the vertical plane.

FIG. 2 shows the extent of the field of view of the sensor arrangement of FIG. 1 in the vertical plane. Thus, the sensors mounted on the vehicle have a field of view of 360 degrees. However, the sensors do not provide a hyperhemispherical field of view. In the context of this application hyperhemispherical means a view which is greater than the hemisphere. Thus, the effective field of view is 90 degrees between the two cones 150 and 160. These two cones 150, 160 are blind spots.

One of ordinary skill in the art will recognize that in an arrangement is shown in FIG. 2, the sensors could be configured to look in the direction of the upper cone and the blind spot would then be the lower cone area and the area inbetween the cones 150, 160 shown in FIG. 2. One of ordinary skill in the art will also recognize that the sensors could be configured to look in the direction of the lower cone and the blind spot would then be upper cone area and the area inbetween the two cones 150, 160 shown in FIG. 2.

Figure 3:
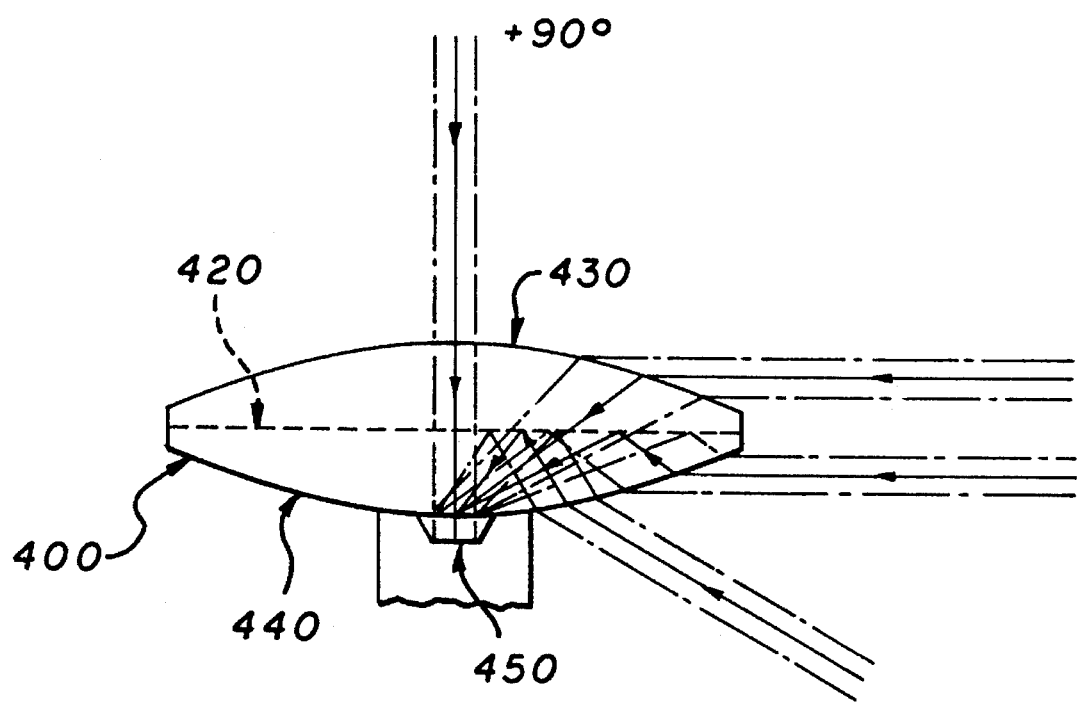
FIG. 3 shows an optical sensor head in accordance with the present invention.
Figure 4:
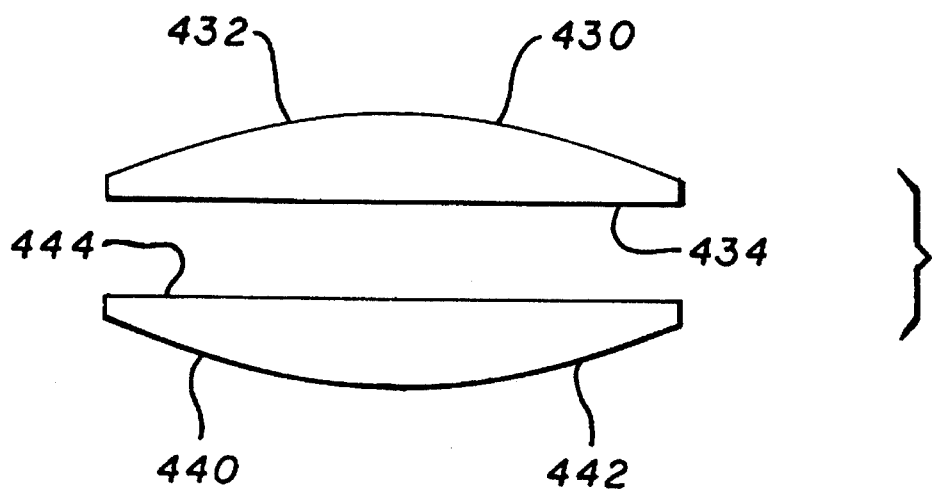
FIG. 4 shows the optical sensor head of FIG. 3 in an exploded view.

Referring now to FIG. 3, shown is an optical sensor head 400 in accordance with the present invention. In a preferred embodiment, a beam splitter coating 420 is positioned or sandwiched between two lenses 430 and 440. Referring now briefly to FIG. 4, what is shown is an exploded view of the plano-convex lenses 430 and 440. For all practical purposes the plano-convex lenses are identical. Hence the plano-convex lens 430 includes a convex surface 432 and planar surface 434. The plano-convex lens 440 includes a convex surface 442 and a planar surface 444. The planar surface 434, 444 of each of the lenses 430 and 440 are in contact with the beam splitter coating 420. The beam splitter coating comprises a film such that it reflects at most fifty (50) percent of the light included thereon. Typical films which have such properties are metal-dielectric coatings.

It is also important to provide a lens material that will optimize the physical size of the sensor head 400. In order to provide the optimal physical size of the sensor head 400, the lenses 430 and 440 of the sensor head 400 are typically comprised of a high-refractive index material such as zinc selenide (ZnSe) or germanium (Ge).

In this embodiment, light signals incident on the optical sensor head are transmitted to the detector 450 in the following manner. Signals which are incident above the beam splitter coating 420 impinge on the first lens 430. The incident light is then focused onto the beam splitter coating 420 and is partially transmitted to the second lens 440. The signal is then transmitted through the second lens to the sensor 450.

Signals which are incident on the sensor head 400 below the beam splitter coating 420 are, again, focused onto the beam splitter coating 420 by the high-refractive index lens 440. Now, however, the beam splitter coating 420 reflects a portion of the signal onto the sensor 450. As is seen, with only two lenses 430 and 440 there is less of a chance for internal reflections which can cause loss of coherence when coherent signals are to be detected.

FIGS. 5 and 6 show a vehicle 300 which carries an optical sensor head in accordance with the present invention. FIG. 5 shows the field of view of the sensor head 400 in the horizontal plane. The sensor head 400 of the present invention 310 affords the sensor 450 a field of view 330 in the horizontal plane which is 360 degrees. In this embodiment, there is no overlapping of fields of view as found in the prior art arrangements of FIGS. 1–4. As shown in FIG. 6 is a field of view 340 of the hyperhemispherical sensor head 400 in the vertical plane. Here, the field of view 340 is greater that 180 degrees in angular extent and contains no blind spots.

The simplicity of the design, involving only three elements, the two lenses 430 and 440 and the film 420, contributes to the cost-effectiveness of the apparatus of the present invention. Further, since the lenses can be manufactured with the optical axis as an axis of rotation, the field of view will subtend 360 degrees in the horizontal plane. Finally, due to the design of the sensor head, the field of view in the vertical plane is limited by the interference with the incident light signals caused by neighboring surfaces. Thus, the sensor may be designed with a field of view which approaches $4\pi$ steradians.

It is understood the above-described embodiments are merely illustrative of the possible specific embodiments which can represent applications of the principle of the present invention. Other arrangements may be readily devised in accordance with these principles by one of ordinary skill in the art without departing from the spirit and scope of the present invention. The scope of the invention is limited only by the following claims:

What is claimed is:

1. An optical sensor head for providing a wide field of view comprising:

first and second lenses, each of the lenses having a planar surface and a convex surface, said first and second lenses positioned so that their planar surfaces face each other and are parellel;

a beam splitting means for reflecting a portion of light thereon, said beam splitting means being positioned between said planar surfaces;

a optical sensor means for detecting light, said optical sensor means located adjacent to and facing the convex surface of the second lens.

2. The optical sensor head according to claim 1 wherein the beam splitting means comprises a film, which is positioned between the first and second lenses.

3. The optical sensor head according to claim 2 wherein the film reflects at most fifty per cent of the light incident thereon.

4. The optical sensor head according to claim 2 in which the film comprises a metal dielectric coating on the planar surface of at least one of the first and second lenses.

5. The optical sensor head according to claim 2 wherein the beam splitting means is in contact with the planar surface of the first lens and the planar surface of the second lens.

6. The optical sensor head according to claim 1 wherein each of the lenses comprises zinc selenide.

7. The optical sensor head according to claim 1 wherein each of the lenses comprises germanium.

8. An optical sensor head for providing a hyperhemispherical field of view, the optical sensor head comprising:

first and second high-refractive index plano-convex lenses, each of the lenses having a planar surface and a substantially convex surface;

a film positioned between the planar surfaces of the first and second plano-convex lenses for splitting light beams impinging thereon; and an optical sensor coupled to the convex surface of the second plano-convex lens.

9. The optical sensor head according to claim 8 wherein each of the lenses comprises zinc selenide (ZnSe).

10. The optical sensor head according to claim 8 wherein the film comprises metal dielectric coating.

11. The system according to claim 8 wherein the film reflects at most fifty per cent of the light incident thereon.

12. The system according to claim 8 wherein each of the lenses comprises germanium.

\* \* \* \* \*